United States Patent
Siva et al.

(10) Patent No.: US 10,282,315 B2
(45) Date of Patent: May 7, 2019

(54) SOFTWARE ASSISTED HARDWARE CONFIGURATION FOR SOFTWARE DEFINED NETWORK SYSTEM-ON-CHIP

(71) Applicant: CAVIUM, INC., San Jose, CA (US)

(72) Inventors: Nimalan Siva, San Ramon, CA (US); Premshanth Theivendran, Foster City, CA (US); Kishore Badari Atreya, San Jose, CA (US)

(73) Assignee: Cavium, LLC, Santa Clara, CA (US)

( * ) Notice: Subject to any disclaimer, the term of this patent is extended or adjusted under 35 U.S.C. 154(b) by 436 days.

(21) Appl. No.: 14/672,006

(22) Filed: Mar. 27, 2015

(65) Prior Publication Data

US 2016/0283413 A1   Sep. 29, 2016

(51) Int. Cl.
| | | |
|---|---|---|
| G06F 13/10 | (2006.01) | |
| G06F 13/40 | (2006.01) | |
| G06F 13/42 | (2006.01) | |
| G06F 15/78 | (2006.01) | |

(52) U.S. Cl.
CPC ........ G06F 13/105 (2013.01); G06F 13/4022 (2013.01); G06F 13/4282 (2013.01); G06F 15/7807 (2013.01)

(58) Field of Classification Search
None
See application file for complete search history.

(56) References Cited

U.S. PATENT DOCUMENTS

| | | |
|---|---|---|
| 5,847,751 A | 12/1998 | Safadi |
| 6,154,464 A | 11/2000 | Feuerstraeter |
| 6,182,258 B1 | 1/2001 | Hollander |
| 6,216,098 B1 | 4/2001 | Clancey |
| 6,253,365 B1 | 6/2001 | Baldwin |
| 6,377,912 B1 | 4/2002 | Sample et al. |
| 6,434,517 B1 | 8/2002 | Le |
| 6,665,864 B1 | 12/2003 | Kawahito et al. |
| 6,667,985 B1 | 12/2003 | Drummond-Murray |
| 6,694,464 B1 | 2/2004 | Quayle et al. |
| 6,728,271 B1 | 4/2004 | Kawamura et al. |
| 6,754,612 B1 | 6/2004 | Vanfladern et al. |
| 6,876,941 B2 | 4/2005 | Nightingale |
| 7,130,783 B1 | 10/2006 | Harer et al. |
| 7,185,247 B2 | 2/2007 | Mak et al. |
| 7,236,918 B2 | 6/2007 | Roesner |
| 7,237,210 B2 | 6/2007 | Likovich, Jr. et al. |
| 7,246,332 B2 | 7/2007 | Likovich, Jr. et al. |
| 7,284,177 B2 | 10/2007 | Hollander et al. |
| 7,325,018 B2 | 1/2008 | Smith |
| 7,472,051 B2 | 12/2008 | Mariani |
| 7,506,281 B1 | 3/2009 | Secatch |

(Continued)

FOREIGN PATENT DOCUMENTS

GB   2336076 A   6/1999

*Primary Examiner* — Idriss N Alrobaye
*Assistant Examiner* — Dayton Lewis-Taylor
(74) *Attorney, Agent, or Firm* — Haverstock & Owens LLP

(57) ABSTRACT

A software and hardware co-validation for SDN SoC method and system are able to be used to test software and hardware using PCIe (or another implementation) utilizing sockets and messages as the communication medium. An entire software stack as well as hardware are able to be tested. Additionally, multiple chips (SoCs) are able to be programmed at the same time, not just one, as in previous implementations.

24 Claims, 3 Drawing Sheets

(56) References Cited

U.S. PATENT DOCUMENTS

| | | |
|---|---|---|
| 7,519,865 B1 | 4/2009 | Maly |
| 7,526,742 B1 | 4/2009 | Edwards |
| 7,565,631 B1 | 7/2009 | Banerjee et al. |
| 7,796,627 B2 | 9/2010 | Hurley et al. |
| 8,214,694 B1 | 7/2012 | McKechnie et al. |
| 8,560,893 B1 | 10/2013 | Hollander et al. |
| 8,832,622 B1 | 9/2014 | Xu |
| 8,984,490 B1 | 3/2015 | Dahan |
| 9,135,382 B1 | 9/2015 | Lu et al. |
| 9,322,872 B2 | 4/2016 | Hill |
| 9,330,227 B1 | 5/2016 | Han et al. |
| 9,506,982 B2 | 11/2016 | Han et al. |
| 9,506,984 B1 | 11/2016 | Vaishampayan |
| 9,547,041 B2 | 1/2017 | Siva |
| 9,606,176 B2 | 3/2017 | Miller et al. |
| 9,626,321 B2 | 4/2017 | Safranek et al. |
| 2002/0054608 A1 | 5/2002 | Wan et al. |
| 2002/0183956 A1 | 12/2002 | Nightingale |
| 2003/0110339 A1 | 6/2003 | Calvignac |
| 2003/0225565 A1 | 12/2003 | Garcia |
| 2005/0108596 A1 | 5/2005 | Deaton |
| 2005/0157653 A1 | 7/2005 | Zeitak |
| 2006/0190871 A1 | 8/2006 | Likovich, Jr. et al. |
| 2007/0217759 A1 | 9/2007 | Dodd |
| 2007/0264730 A1 | 11/2007 | Frodsham |
| 2007/0277163 A1 | 11/2007 | Avresky |
| 2008/0098366 A1 | 4/2008 | Fong |
| 2009/0144675 A1 | 6/2009 | Haufe |
| 2010/0031000 A1 | 2/2010 | Flynn |
| 2010/0306728 A1 | 12/2010 | Adeishar et al. |
| 2011/0010720 A1 | 1/2011 | Smith et al. |
| 2011/0063093 A1 | 3/2011 | Fung et al. |
| 2011/0145795 A1 | 6/2011 | Khanapurkar et al. |
| 2011/0307233 A1 | 12/2011 | Tseng et al. |
| 2012/0174068 A1 | 6/2012 | Guttleisch et al. |
| 2012/0198174 A1 | 8/2012 | Nellans et al. |
| 2012/0255022 A1 | 10/2012 | Ocepek et al. |
| 2012/0284432 A1* | 11/2012 | Chen .................... G06F 3/0607 710/17 |
| 2012/0284446 A1* | 11/2012 | Biran .................. G06F 13/4022 710/306 |
| 2012/0300649 A1 | 11/2012 | Parmar et al. |
| 2013/0007330 A1 | 1/2013 | Ryzhyk et al. |
| 2013/0028105 A1 | 1/2013 | Chew |
| 2013/0080761 A1 | 3/2013 | Garrett et al. |
| 2013/0081005 A1 | 3/2013 | Gounares et al. |
| 2013/0198706 A1 | 8/2013 | Mehta et al. |
| 2013/0318486 A1 | 11/2013 | Sasaki |
| 2014/0068360 A1 | 3/2014 | Lai et al. |
| 2014/0082242 A1* | 3/2014 | Murphy .................. G06F 13/24 710/263 |
| 2014/0112339 A1 | 4/2014 | Safranek |
| 2014/0195711 A1* | 7/2014 | Bhatia ............... G06F 13/4221 710/313 |
| 2014/0244888 A1* | 8/2014 | Kallickal ........... G06F 13/4022 710/313 |
| 2014/0282312 A1 | 9/2014 | Stamness et al. |
| 2014/0289445 A1* | 9/2014 | Savich ............... G06F 13/4022 710/317 |
| 2015/0161385 A1 | 6/2015 | Gounares et al. |
| 2015/0234008 A1 | 8/2015 | Miller et al. |
| 2015/0286470 A1 | 10/2015 | Dahan |
| 2015/0301108 A1 | 10/2015 | Hamid et al. |
| 2016/0092329 A1 | 3/2016 | Musunuri et al. |
| 2016/0134653 A1 | 5/2016 | Vallone et al. |
| 2016/0139202 A1 | 5/2016 | Patel et al. |
| 2016/0139204 A1 | 5/2016 | Han et al. |
| 2016/0139205 A1 | 5/2016 | Siva et al. |
| 2016/0140006 A1 | 5/2016 | Siva et al. |
| 2016/0140284 A1 | 5/2016 | Han et al. |
| 2016/0140285 A1 | 5/2016 | Han et al. |
| 2016/0140286 A1 | 5/2016 | Siva et al. |
| 2016/0142280 A1 | 5/2016 | Krishnamoorthy et al. |
| 2016/0366036 A1 | 12/2016 | Gupta et al. |

* cited by examiner

SOFTWARE ASSISTED HARDWARE CONFIGURATION FOR SOFTWARE DEFINED NETWORK SYSTEM-ON-CHIP

FIELD OF INVENTION

The present invention relates to the field of networking.

BACKGROUND OF THE INVENTION

Software-defined networking (SDN) is an approach to computer networking that allows network administrators to manage network services through abstraction of lower-level functionality. A system on a chip or System-on-Chip (SoC) is an integrated circuit (IC) that integrates all components of an electronic system into a single chip. It is possible to implement many networking features on a single chip using combinations of software and hardware.

BRIEF SUMMARY

A software and hardware co-validation for SDN SoC method and system are able to be used to test software and hardware using PCIe (or another implementation) utilizing sockets and messages as the communication medium.

In one aspect, a system comprises a software module, a hardware module and a Peripheral Component Interconnect express driver configured for communicating between the software module and the hardware module, wherein the Peripheral Component Interconnect express driver utilizes transmission control protocol packets for communicating and is embedded in a kernel of the system. Communicating includes intercepting a low level instruction and generating transmission control protocol socket connection. Communicating includes: generating a socket, identifying the socket, connecting to a client, sending and receiving messages to and from the client, translating the messages to transmission layer packets communicating with the driver and closing the socket. The software module comprises an application programming interface. The hardware module comprises an emulation of hardware. The hardware module comprises physical hardware components. The hardware module comprises a system-on-chip configuration. The Peripheral Component Interconnect express driver enables software defined network testing and hardware testing.

In another aspect, a device comprises a memory for storing information including a kernel, wherein the kernel includes a device driver configured for communicating with a system-on-chip configuration using one or more sockets and a processing component coupled to the memory, the processing component configured for processing the information. Communicating includes transmitting Peripheral Component Interconnect express transmission layer packets. The device driver is a Peripheral Component Interconnect express driver with Transmission Control Protocol sockets. The device driver is embedded in a kernel of the device. Communicating includes intercepting a low level instruction and generating transmission control protocol socket connection. Communicating includes: generating a socket, identifying the socket, connecting to a client, sending and receiving messages to and from the client, translating the messages to transmission layer packets communicating with the driver and closing the socket. The device driver enables software defined network testing and hardware testing.

In another aspect, a method programmed in a device comprises generating a socket, identifying the socket, connecting to a client, sending and receiving messages to and from the client, translating the messages to transmission layer packets communicating with a device driver and closing the socket. The transmission layer packets are Peripheral Component Interconnect express transmission layer packets. The device driver is a Peripheral Component Interconnect express driver with Transmission Control Protocol sockets. The device driver is embedded in a kernel of the device. The device driver enables software defined network testing and hardware testing.

In another aspect, a system comprises a software stack, a system-on-chip hardware module and a Peripheral Component Interconnect express driver configured for communicating between the software stack and the system-on-chip hardware module, wherein the Peripheral Component Interconnect express driver utilizes transmission control protocol packets for communicating and is embedded in a kernel of the system. Communicating includes intercepting a low level instruction and generating transmission control protocol socket connection. Communicating includes: generating a socket, identifying the socket, connecting to a client, sending and receiving messages to and from the client, translating the messages to transmission layer packets communicating with the driver and closing the socket. The software stack comprises an application programming interface. The Peripheral Component Interconnect express driver enables software defined network testing and hardware testing.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
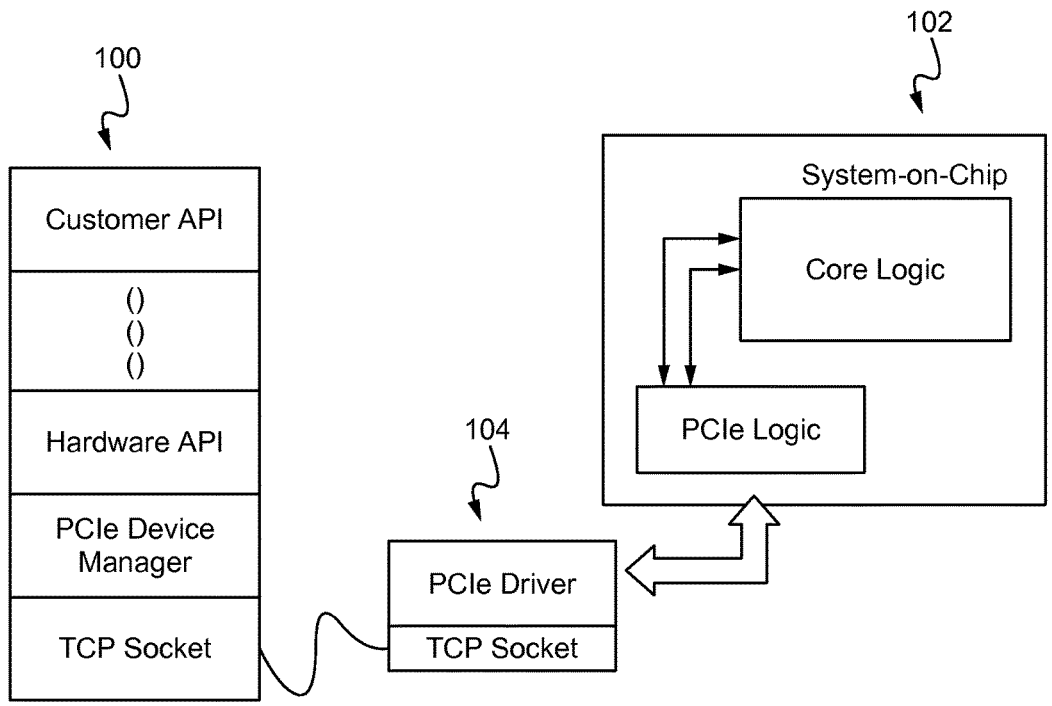
FIG. 1 illustrates a diagram of a software-defined profile loading to a system-on-chip according to some embodiments.

In traditional networking Application Specific Integrated Circuits (ASIC), many operations such as packet parsing, lookup, and others are hardened. With the evolution of a software defined network (SDN), recent ASIC technologies allow networking features to be defined in the software (as shown in FIG. 1). With a given collection of Application Programming Interfaces (APIs), a given individual/team is able to generate a fully customized profile to suit his/her/their needs. The collection of APIs through the TCP socket are able to be thought of along the same line as the OSI Layer. At the lower levels, the hardware APIs represent the actual configuration of the hardware which is able to be represented as hardware.write(address, data) or hardware.read(address,data). The Peripheral Component Interconnect express (PCIe) Device Manager takes these hardware transactions and configures the System-on-Chip (SoC) via TCP Socket. Furthermore, on the hardware side, the transaction from the TCP Socket feeds into a PCIe driver which actually does the signal-level pin toggling of System-on-Chip's PCIe core logic.

Multiple devices are able to be configured via the TCP socket, allowing for a single point of control when setting up a cloud of SDN devices/chips.

FIG. 1 illustrates a diagram of a software-defined profile loading to a system-on-chip according to some embodiments. A software stack 100 includes an API, a hardware manager, a PCIe Device manager, a TCP socket and/or any other drivers or interfaces. The software stack 100 is able to communicate with a SoC 102 through a custom PCIe device driver 104 with TCP sockets. The SoC 102 includes core logic and PCIe logic. By using the PCIe driver with TCP sockets (or another implementation), the software stack 100 and the SoC 102 are able to be tested. For example, test messages or communications are able to be sent, and the results or return values are able to be analyzed. The SoC 102 is able to be hardware or an emulation of hardware.

Software and SDN Application

Software used to program network ASICs has a very high level of abstraction, with several layers of APIs and feature specific code. Using these APIs, specific profiles are able to be developed and used by individuals/teams. A profile, in this case, refers to a particular device configuration enabling the device to carry out certain network functions.

For an SDN SoC, these profiles control the hardware device, hence they are important during deployment. Although the majority of software testing is done using the white model, this does not completely guarantee seemless integration with the post-silicon hardware. In the hardware section, a more robust approach to testing SDN software is discussed.

Furthermore, as SDN evolves, complicated hardware to support SDN-based configurations will be developed and will have a need to be verified end-to-end. One of the challenges in verification of an SDN SoC is that without some configuration from software, the ASIC will do very little. Software is what is used to define the feature set to overlay. Traditional hardware verification methods are able to be used to verify the hardware; however, whether or not this particular hardware is able to actually perform the features that the SDN defines are not able to be verified using a traditional simulation.

Software is important to ensure that an SDN SoC is able to function as a traditional packet processor. SDN provides a clear benefit to a user in that it provides flexibility to define features that their application utilizes.

Hardware

To verify a significant amount of the software stack, prior to post-silicon, a simulation-based or hardware-accelerated design (full-chip/device) is used. This allows verification and software engineers to quickly find bugs in both hardware and software within a reasonable amount of time. This approach also allows key features such as learning and table aging to be tested in real-time.

Although the device is able to be configured and initialized via many different interfaces, the primary and most common route is through PCI express (PCIe). Connected to the PCIe interface is a translator/driver, which converts messages to PCIe Transition Layer Packets (TLPs) and vice-versa. The driver is attached to the device, and it will also be simulated/emulated.

Communicating with Hardware

In an actual network environment, an application or software is running on a server communicating with the hardware device via direct connections. In the absence of the actual device, a key challenge is the communication mechanism used in the simulation/emulation environment. The communication mechanism should be light, fast, bi-directional, and transparent to the end user.

The method described herein allows communications between hardware and software via PCIe, using TCP sockets and messages as the communication medium.

PCIe root complex <----> TCP messages <----> host PCIe endpoint

The following is used to correctly set up and establish a connection and transfer messages.
1) create socket
2) identify socket
3) wait for incoming connection
4) client to connect
5) send and receive messages
6) translate messages to PCIe TLPs communicating with PCIe device Manager/Driver
7) close socket.

Figure 2:
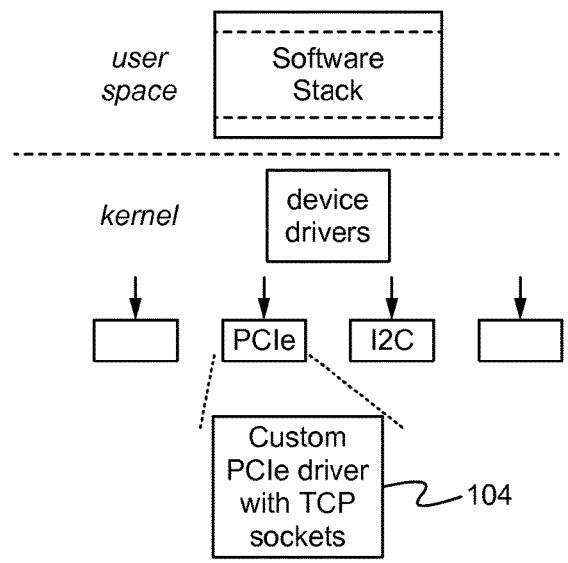
FIG. 2 illustrates a custom PCIe device driver according to some embodiments.

A key factor in maintaining a transparent layer is by embedding the code/logic in the lowest PCIe layer which resides in the software kernel space as shown in FIG. 2. On the hardware side, a similar approach is used but is separated into two parts—the TCP layer and the PCIe driver.

FIG. 2 illustrates a custom PCIe device driver according to some embodiments. The custom PCIe device driver 104 is used to correctly set up and establish a connection and transfer messages. The custom PCIe device driver 104 creates a socket, identifies the socket, waits for an incoming connection, client connection, sends and receives messages, translates messages to PCIe TLPs communicating with PCIe device Manager/Driver, and closes the socket. The custom PCIe device driver 104 is able to be used to verify the hardware (and hardware features) and the software stack in one step. Although PCIe is described herein, other interfaces are able to be utilized.

Figure 3:
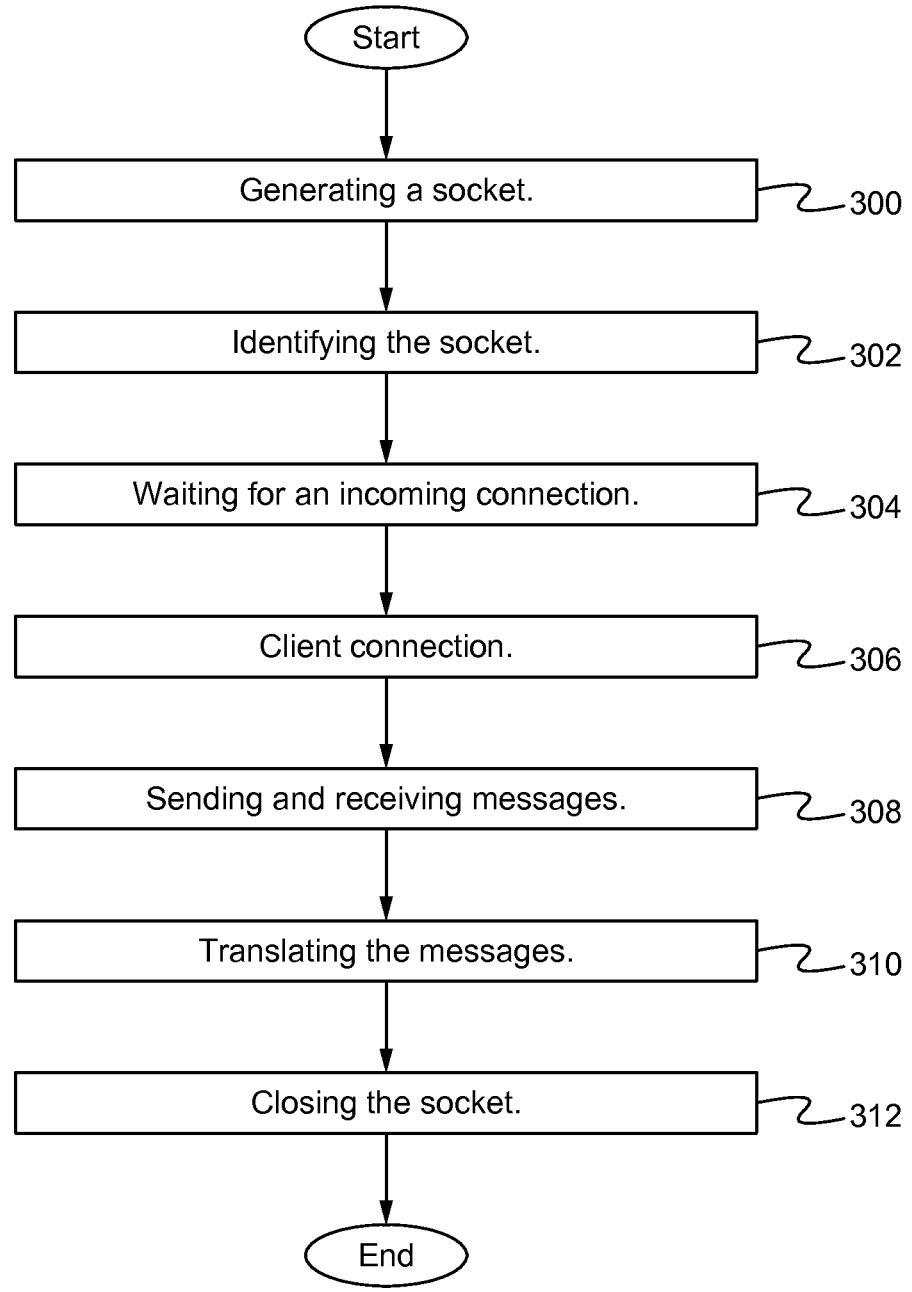
FIG. 3 illustrates a flowchart of a method of software and hardware co-validation for SDN SoC according to some embodiments.

FIG. 3 illustrates a flowchart of a method of software and hardware co-validation for SDN SoC according to some embodiments. After APIs and an SDN SoC are developed, a PCIe driver is used to enable communication and thus testing between the APIs and the SDN SoC. The PCIe driver is utilized by generating a socket in the step 300. For example, after intercepting a low level instruction, a socket is generated. In the step 302, the socket is identified (e.g., given a socket identifier). In the step 304, the PCIe driver waits for an incoming connection. In the step 306, a client connects to the PCIe driver. In the step 308, messages are sent to and received from the client. In the step 310, the messages are translated to PCIE TLPs communicating with the PCIe device manager/driver. In the step 312, the socket is closed. Additional testing steps are able to be implemented after the socket is closed. For example, analysis of the results (e.g., return values) of the communications is able to be performed. Furthering the example, the PCIe driver is able to be used to perform signal-level pin toggling of the SoC's PCIe core logic. Multiple devices are able to be configured via TCP sockets. In some embodiments, fewer or additional steps are implemented. In some embodiments, the order of the steps is modified.

Figure 4:
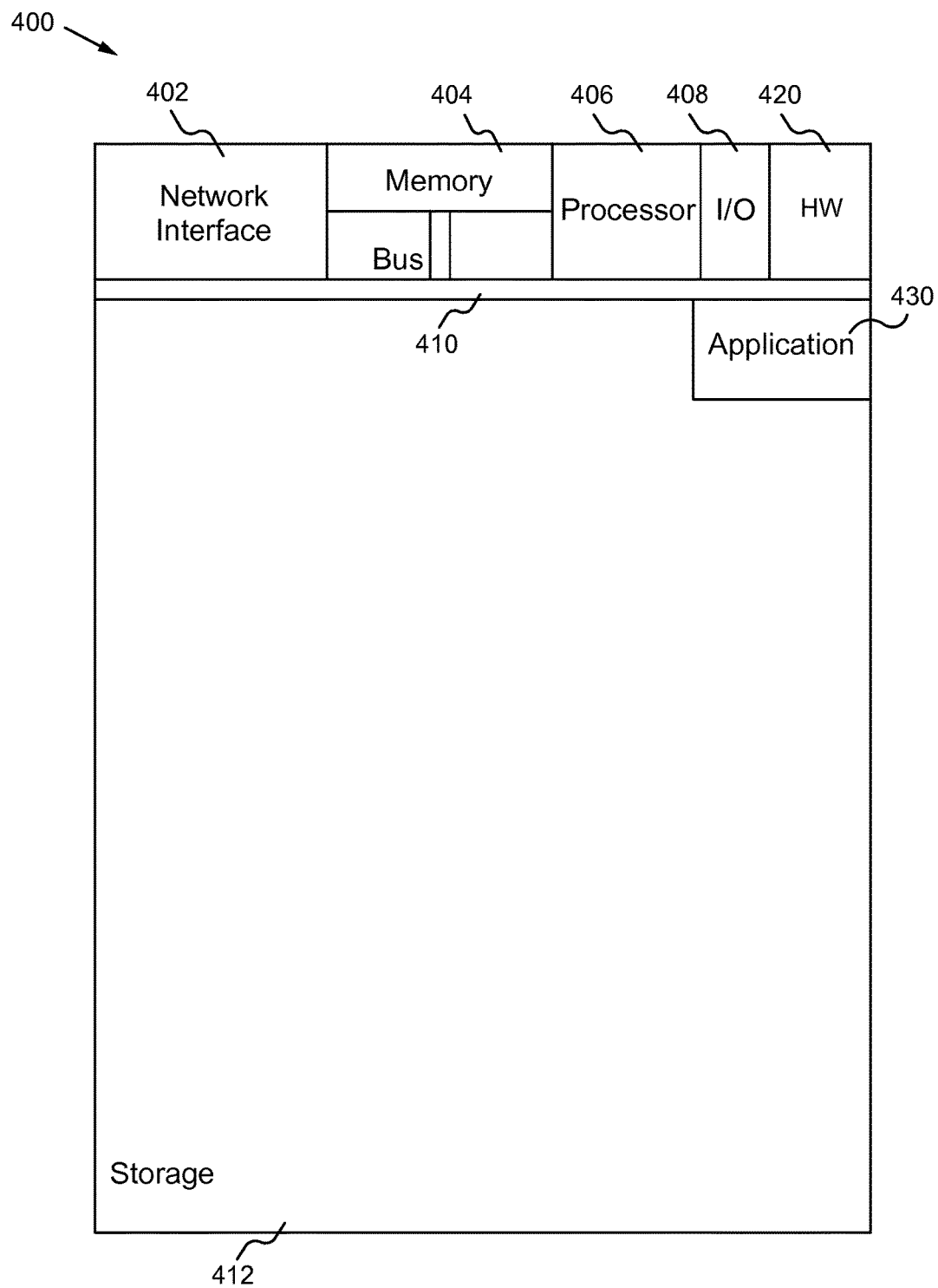
FIG. 4 illustrates a block diagram of an exemplary computing device configured to implement the software and hardware co-validation for SDN SoC method according to some embodiments.

FIG. 4 illustrates a block diagram of an exemplary computing device configured to implement the software and hardware co-validation for SDN SoC method according to some embodiments. A computing device 400 is able to be used to acquire, store, compute, process, communicate, receive, send, and/or display information such as data packets. In general, a hardware structure suitable for implementing the computing device 400 includes a network interface 402, a memory 404, a processor 406, I/O device(s) 408, a bus 410 and a storage device 412. The choice of processor(s) is not critical as long as suitable processor(s) with sufficient speed are chosen. The memory 404 is able to be any conventional computer memory known in the art. The storage device 412 is able to include memory, a hard drive, CDROM, CDRW, DVD, DVDRW, High Definition disc/drive, ultra-HD drive, flash memory card or any other storage device. The computing device 400 is able to include one or more network interfaces 402. An example of a network interface includes a network interface controller or a network card connected to an Ethernet or other type of Local Area Network (LAN). The I/O device(s) 408 are able to include one or more of the following: keyboard, mouse, monitor, screen, printer, modem, touchscreen, button interface and other devices. Software and hardware co-validation for SDN SoC application(s) 430 used to perform the software and hardware co-validation for SDN SoC method may be stored in the storage device 412 and memory 404 and processed as applications are typically processed. More or fewer components shown in FIG. 4 are able to be included in the computing device 400. In some embodiments, software and hardware co-validation for SDN SoC hardware 420 is included. Although the computing device 400 in FIG. 4 includes applications 430 and hardware 420 for the software and hardware co-validation for SDN SoC method, the software and hardware co-validation for SDN SoC method is able to be implemented on a computing device in hardware, firmware, software or any combination thereof. For example, in some embodiments, the software and hardware co-validation for SDN SoC applications 430 are programmed in a memory and executed using a processor. In another example, in some embodiments, the software and hardware co-validation for SDN SoC hardware 420 is programmed hardware logic including gates specifically designed to implement the software and hardware co-validation for SDN SoC method.

In some embodiments, the software and hardware co-validation for SDN SoC application(s) 430 include several applications and/or modules. In some embodiments, modules include one or more sub-modules as well. In some embodiments, fewer or additional modules are able to be included.

Examples of suitable computing devices include a server, a personal computer, a laptop, a mobile device (e.g., smart phone), a network switch, a router, a hub, any other networking equipment and any other computing devices.

To utilize the software and hardware co-validation for SDN SoC method and system, software and hardware (or an emulation of hardware) are developed. Specifically, software and an emulation of hardware are developed for an SDN SoC. The software and hardware are then able to be tested using PCIe (or another implementation) utilizing sockets and messages as the communication medium. For example, after an individual/team generates one or more APIs and develops hardware or an emulation of the hardware, the individual/team or another entity is able to test the software and hardware using the software and hardware co-validation for SDN SoC method and system.

In operation, the software and hardware co-validation for SDN SoC method and system enable communication between hardware and software via PCIe using TCP sockets and messages which permits efficient testing and analysis of software and hardware aspects of an SoC. An entire software stack as well as hardware are able to be tested. Additionally, multiple chips (SoCs) are able to be programmed at the same time, not just one, as in previous implementations.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

We claim:

1. A software and hardware co-validation system comprising:
   a hardware module for a programmable microchip including one of a group consisting of hardware and emulation software that emulates the hardware, the emulation software stored on a first non-transitory computer-readable medium;
   a software module stored on a second non-transitory computer-readable medium and including a plurality of application programming interfaces (APIs) that together define a system profile including configuration data for a plurality of functions, wherein the APIs are not programmed into the hardware, but are designed to be programmed into the hardware, and when programmed into the hardware, the APIs enable the hardware to perform the functions of the system profile using the configuration data, and a first Peripheral Component Interconnect express (PCIe) driver configured for receiving and transmitting data between the APIs and the hardware module; and
   a second Peripheral Component Interconnect express (PCIe) driver separate from the hardware module and configured for translating and communicating messages between the first PCIe driver of the software module and the hardware module.

2. The system of claim 1 wherein the translating and communicating messages includes intercepting a low level instruction and generating transmission control protocol socket connection.

3. The system of claim 1 wherein the translating and communicating messages includes:
   generating a socket;
   identifying the socket;
   connecting to a client;
   sending and receiving messages to and from the client;
   translating the messages to transmission layer packets communicating with the driver; and
   closing the socket.

4. The system of claim 1 wherein the hardware module comprises an emulation of hardware.

5. The system of claim 1 wherein the hardware module comprises physical hardware components.

6. The system of claim 1 wherein the hardware module comprises a system-on-chip configuration.

7. The system of claim 1 wherein the second PCIe driver enables software defined network testing and hardware testing.

8. The system of claim 1 wherein the second PCIe driver utilizes transmission control protocol packets for communicating and is embedded in a kernel of the system.

9. A software and hardware co-validation device comprising:
a memory for storing information including a device driver configured for communicating with a programmable system-on-chip configuration, wherein the device driver is communicatively coupled with a hardware module and a client having a stack, the hardware module including one of a group consisting of hardware and emulation software that emulates the hardware and the stack including a plurality of application programming interfaces (APIs) that together define a system profile including configuration data for a plurality of functions, wherein the APIs are not programmed into the hardware, but are designed to be programmed into the hardware, and when programmed into the hardware, the APIs enable the hardware to perform the functions of the system profile using the configuration data, and a first Peripheral Component Interconnect express (PCIe) driver configured for receiving and transmitting data between the APIs and the hardware module; and
a processing component coupled to the memory, the processing component configured for processing the information, wherein the device driver is separate from the hardware module and the communicating facilitated by the device driver is between the first PCIe driver of the client and the hardware module.

10. The device of claim 9 wherein the communicating includes transmitting PCIe transmission layer packets.

11. The device of claim 9 wherein the device driver is a second PCIe driver with Transmission Control Protocol sockets.

12. The device of claim 9 wherein the device driver is embedded in a kernel of the device.

13. The device of claim 9 wherein the communicating includes intercepting a low level instruction and generating transmission control protocol socket connection.

14. The device of claim 9 wherein the communicating includes:
generating a socket;
identifying the socket;
connecting to the client;
sending and receiving messages to and from the client;
translating the messages to transmission layer packets communicating with the driver; and
closing the socket.

15. The device of claim 9 wherein the device driver enables software defined network testing and hardware testing.

16. A method programmed in a software and hardware co-validation device, the method comprising:
with the software and hardware co-validation device:
facilitating communication between a hardware module for a programmable microchip including one of a group consisting of hardware and emulation software that emulates the hardware and a first Peripheral Component Interconnect express (PCIe) driver of a client by:
generating a socket;
identifying the socket;
connecting to the client;
sending and receiving messages to and from the client;
translating the messages to transmission layer packets; and
closing the socket;
wherein the software and hardware co-validation device is separate from but communicatively coupled with:
the hardware module; and
the client, wherein the client has a stack including both a plurality of application programming interfaces (APIs) that together define a system profile including configuration data for a plurality of functions, wherein the APIs are not programmed into the hardware, but are designed to be programmed into the hardware, and when programmed into the hardware, the APIs enable the hardware to perform the functions of the system profile using the configuration data and a first Peripheral Component Interconnect express (PCIe) driver configured for receiving and transmitting data between the APIs and the hardware module, and further wherein the device is a second Peripheral Component Interconnect express (PCIe) driver.

17. The method of claim 16 wherein the transmission layer packets are PCIe transmission layer packets.

18. The method of claim 16 wherein the device is embedded in a kernel of the device.

19. The method of claim 16 wherein the device enables software defined network testing and hardware testing.

20. A software and hardware co-validation system comprising:
a programmable system-on-chip hardware module including one of a group consisting of hardware and emulation software stored on a first non-transitory computer-readable medium that emulates the hardware;
a software stack stored on a second non-transitory computer-readable medium and including a plurality of application programming interfaces (APIs) that together define a system profile including configuration data for a plurality of functions, wherein the APIs are not programmed into the hardware, but are designed to be programmed into the hardware, and when programmed into the hardware, the APIs enable the hardware to perform the functions of the system profile using the configuration data, and a stack Peripheral Component Interconnect express (PCIe) driver configured for receiving and transmitting data between the APIs and the system-on-chip hardware module; and
a validation Peripheral Component Interconnect express (PCIe) driver independent of the stack PCIe driver and the system-on-chip hardware module and configured for translating and communicating messages between the stack PCIe driver of the software stack and the system-on-chip hardware module.

21. The system of claim 20 wherein the translating and communicating messages includes intercepting a low level instruction and generating transmission control protocol socket connection.

22. The system of claim 20 wherein the translating and communicating messages includes:
generating a socket;
identifying the socket;
connecting to a client;
sending and receiving messages to and from the client;
translating the messages to transmission layer packets communicating with the driver; and
closing the socket.

23. The system of claim 20 wherein the validation PCIe driver enables software defined network testing and hardware testing.

24. The system of claim 20 wherein the validation PCIe driver utilizes transmission control protocol packets for communicating and is embedded in a kernel of the system.

* * * * *